Feb. 20, 1923.
A. C. HALL
DRIER
Filed Apr. 15, 1922     2 sheets-sheet 1
1,446,253
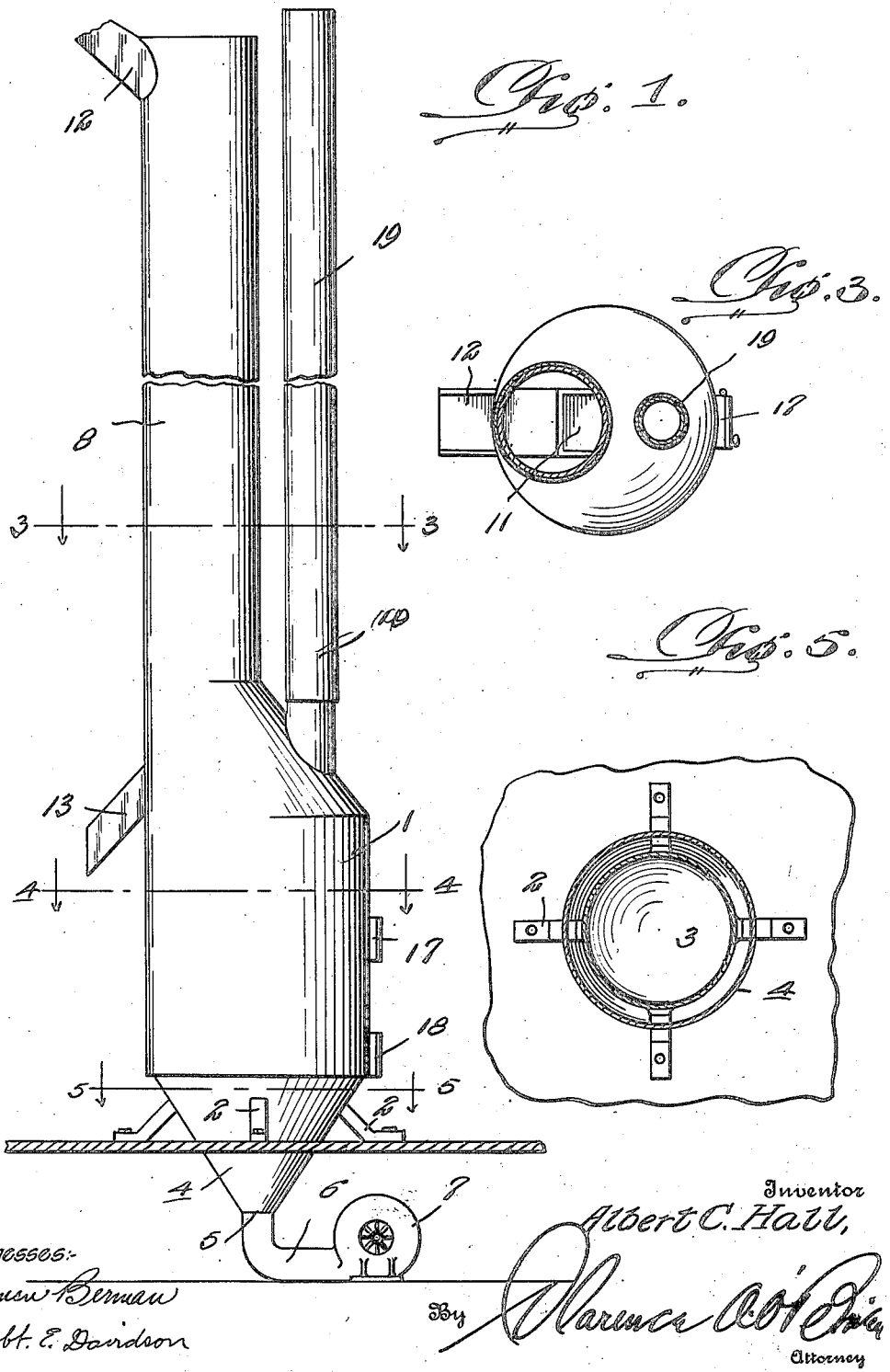

Feb. 20, 1923.
A. C. HALL
DRIER
Filed Apr. 15, 1922
1,446,253
2 sheets-sheet 2
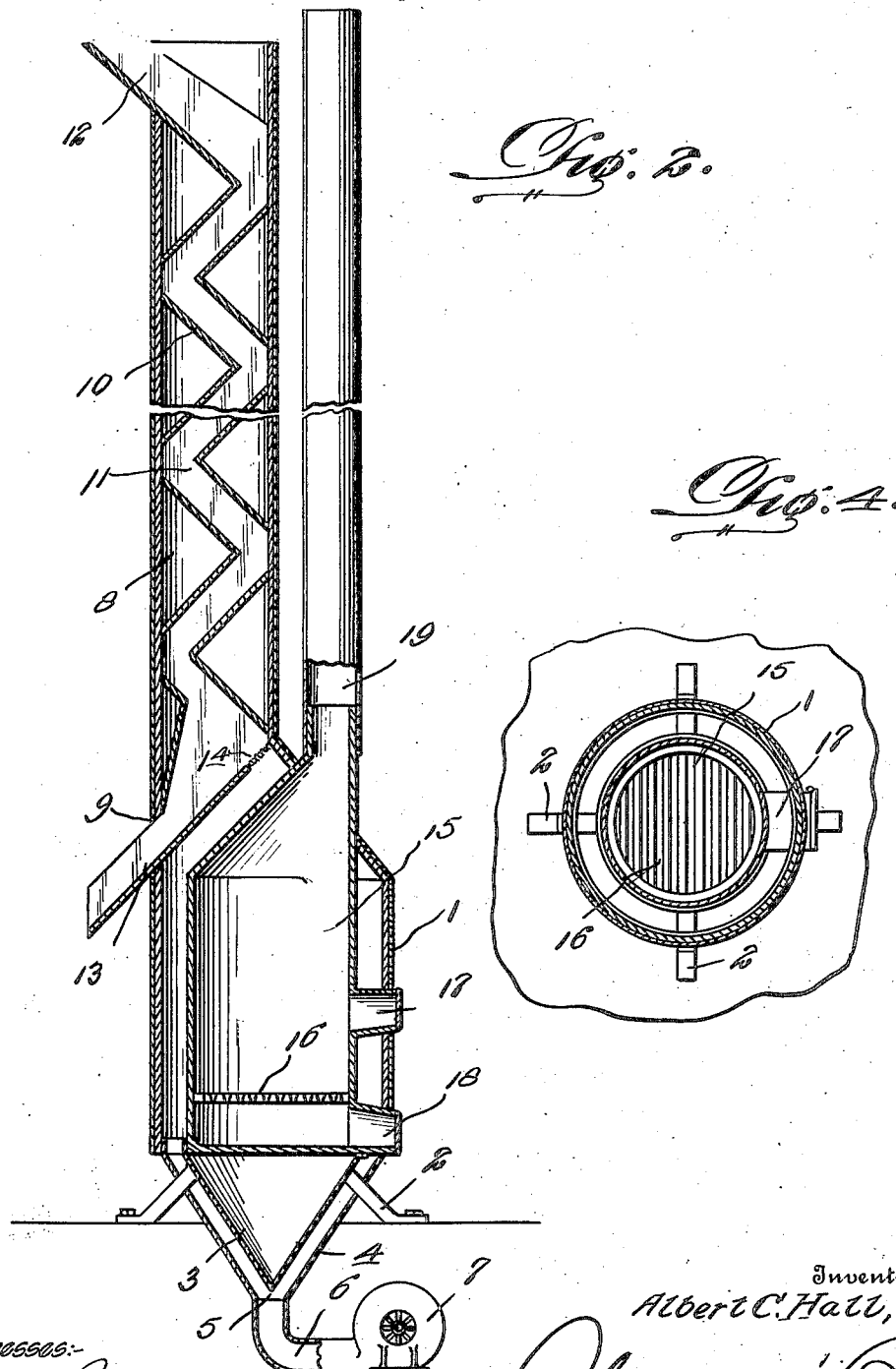

Patented Feb. 20, 1923.

1,446,253

UNITED STATES PATENT OFFICE.

ALBERT C. HALL, OF ELY, MINNESOTA.

DRIER.

Application filed April 15, 1922. Serial No. 553,217.

*To all whom it may concern:*

Be it known that I, ALBERT C. HALL, a citizen of the United States, residing at Ely, in the county of St. Louis and State of Minnesota, have invented new and useful Improvements in Driers, of which the following is a specification.

In carrying out the present invention it is my purpose to provide a drier whereby slate, gravel and other materials may be thoroughly dried, and whereby during the drying operation any dirt or other foreign substance may be blown out of the slate, gravel or other material.

It is also my purpose to improve and simplify the general construction of hot air driers and to provide a drier which will operate efficiently and effectively for its intended purpose and one wherein the component parts will be so arranged and co-related as to reduce the possibility of derangement to a minimum.

In the accompanying drawings:—

Figure 1 is a view in side elevation of a drier constructed in accordance with my invention.

Figure 2 is a vertical sectional view through the same.

Figure 3 is a cross sectional view on the line 3—3 of Figure 1.

Figure 4 is a cross sectional view on the line 4—4 of Figure 1.

Figure 5 is a similar view on the line 5—5 of Figure 1.

Referring now to the drawings in detail, 1 designates a vertical drum suitably mounted upon supporting legs 2 and having its lower end equipped with a depending cone-shaped bottom 3 surrounded by a correspondingly shaped jacket 4 spaced apart from the cone-shaped bottom 3 and having its lower end formed with an inlet opening 5 with which is connected one end of an air supply conduit 6, the other end of which is connected with a blower 7 driven by some suitable mechanism.

Arranged above the drum 1 and connected to the top of the drum and in open communication therewith is a vertical flue 8, and formed in the lower end of the flue 8 at the junction of the flue with the top wall of the drum 1 is a discharge opening 9. Arranged within the flue 8 and extending from the top of the flue to the bottom thereof is a series of baffle plates 10 arranged in pairs, those of each pair being spaced apart in parallelism and inclined in a direction reverse to the inclination of the adjoining pair, so as to provide a tortuous passage 11, as clearly illustrated in Figure 2 of the drawings.

Supported within the upper end of the flue 8 and in open communication with the upper end of the passage 11 is a receiving trough 12, while arranged within the lower end of the flue and in open communication with the bottom end of the passage is a discharge trough 13 that projects outwardly through the discharge opening 9 and formed in the bottom wall of the discharge trough 13 within the flue is an opening. Across this opening is a screen 14 that establishes communication between the passage 11 and the interior of the drum 1.

Suitably mounted within the drum 1 and spaced apart from the side and top walls thereof is a furnace 15 of appropriate construction. In the present instance this furnace is provided with a grate 16 and with a fire door 17 and an ash door 18, the latter controlling communication with the ash pit below the grate 16. The upper end of the furnace 15 opens into a stack 19 that extends upwardly from the furnace and lies parallel with the flue 8.

In practice, the fire is built within the furnace 15 and when the air within the drum is heated to the desired temperature the blower 7 is set in operation, and in the operation of the blower 7 heated air is blown through the screen 14 and the tortuous passage 11. The slate, gravel or other material to be dried is now fed into the discharge trough 12 and traverses the tortuous passage 11 and is discharged by way of the discharge trough 13. In the travel of the material through the tortuous passage the hot air from the drum 1 dries the material and at the same time blows any dirt or other foreign matter out of such material, as is readily apparent.

While I have herein shown and described one preferred form of my invention by way of illustration, I wish it to be understood that I do not limit or confine myself to the precise details of construction herein shown and described, as modifications and variations may be made within the scope of the claims and without departing from the spirit of my invention.

Having thus described my invention, what is claimed as new, is:—

1. A drier comprising a drum, a vertical flue having its lower end connected with said drum and in open communication therewith and formed with a discharge opening at the junction of the flue with said drum, a series of baffle plates within said flue extending from the top to the bottom thereof and providing a tortuous passage for the material to be dried, said passage communicating with said discharge opening, means for heating said drum and means for blowing the heated air through said passage.

2. A drier comprising a drum, a vertical flue having its lower end connected with said drum and in open communication therewith and formed with a discharge opening at the junction of the flue with said drum, a series of baffle plates within said flue extending from the top to the bottom thereof and providing a tortuous passage for the material to be dried, said passage communicating with said discharge opening, a furnace within said drum for heating the latter, and means for blowing the heated air through said passage.

3. A drier comprising a drum, a vertical flue having its lower end connected with said drum and in open commuication therewith and formed with a discharge opening at the junction of the flue with said drum, a series of baffle plates within said flue extending from the top to the bottom thereof and providing a tortuous passage for the material to be dried, said passage communicating with said discharge opening, a furnace within said drum for heating the latter and a blower connected with the lower end of said drum for blowing the heated air through said tortuous passage.

4. A drier comprising a drum, a vertical flue having its lower end connected with said drum and in open communication therewith and formed with a discharge opening at the junction of the flue with said drum, a series of baffle plates within said flue extending from the top to the bottom thereof and providing a tortuous passage for the material to be dried, said passage communicating with said discharge opening, a cone-shaped bottom on said drum, a correspondingly shaped jacket surrounding said bottom and spaced apart therefrom, means within said drum for heating the latter and means connected to said jacket for blowing the heated air through said drum and into said tortuous passage.

In testimony whereof I affix my signature.

ALBERT C. HALL.